United States Patent
Muramatsu et al.

(10) Patent No.: US 7,354,065 B2
(45) Date of Patent: Apr. 8, 2008

(54) KNEE BOLSTER

(75) Inventors: Mutsuo Muramatsu, Aichi (JP); Shinji Hara, Aichi (JP); Yohei Mabashi, Aichi (JP); Tsunenori Kishimoto, Aichi (JP); Toyoaki Kato, Aichi (JP)

(73) Assignee: Mitsubishi Jidodhsa Kogyo Kabushiki Kaisha, Tokyo (JP)

( * ) Notice: Subject to any disclaimer, the term of this patent is extended or adjusted under 35 U.S.C. 154(b) by 250 days.

(21) Appl. No.: 10/852,184

(22) Filed: May 25, 2004

(65) Prior Publication Data

US 2005/0001416 A1    Jan. 6, 2005

(30) Foreign Application Priority Data

May 27, 2003    (JP) .............................. 2003-148704

(51) Int. Cl.
*B60R 21/045* (2006.01)
(52) U.S. Cl. ..................................... 280/752; 280/751
(58) Field of Classification Search ................ 280/752, 280/748, 750, 751
See application file for complete search history.

(56) References Cited

U.S. PATENT DOCUMENTS

| | | | | |
|---|---|---|---|---|
| 3,931,988 | A | * | 1/1976 | Oehm et al. ................. 280/807 |
| 4,951,963 | A |   | 8/1990 | Behr et al. |
| 4,978,136 | A | * | 12/1990 | Tomita et al. ............... 280/751 |
| 5,482,319 | A | * | 1/1996 | Yoshimura et al. .......... 280/752 |
| 5,518,270 | A | * | 5/1996 | Hanada et al. ............... 280/751 |
| 6,170,872 | B1 | * | 1/2001 | Bair et al. .................... 280/751 |
| 6,491,322 | B1 | * | 12/2002 | Ryner ........................... 280/751 |
| 6,702,324 | B2 | * | 3/2004 | Shimoyamada et al. ..... 280/752 |
| 6,793,246 | B2 | * | 9/2004 | Horsch ......................... 280/751 |
| 2003/0173763 | A1 |   | 9/2003 | Yamazaki et al. |

* cited by examiner

Primary Examiner—Eric Culbreth
(74) Attorney, Agent, or Firm—Birch, Stewart, Kolasch & Birch, LLP

(57) ABSTRACT

A knee bolster whose load receiving parts absorb load from the knees of seated occupants of various physical sizes is provided. An upper knee bolster and a lower knee bolster are each provided with a load receiving part that receives load from the knees of a seated occupant who moves forward in the direction of vehicle length in the event of a vehicle head-on collision, and a deforming part that moves the load receiving part, which has been deformed by the load, forward in the direction of vehicle length.

5 Claims, 7 Drawing Sheets

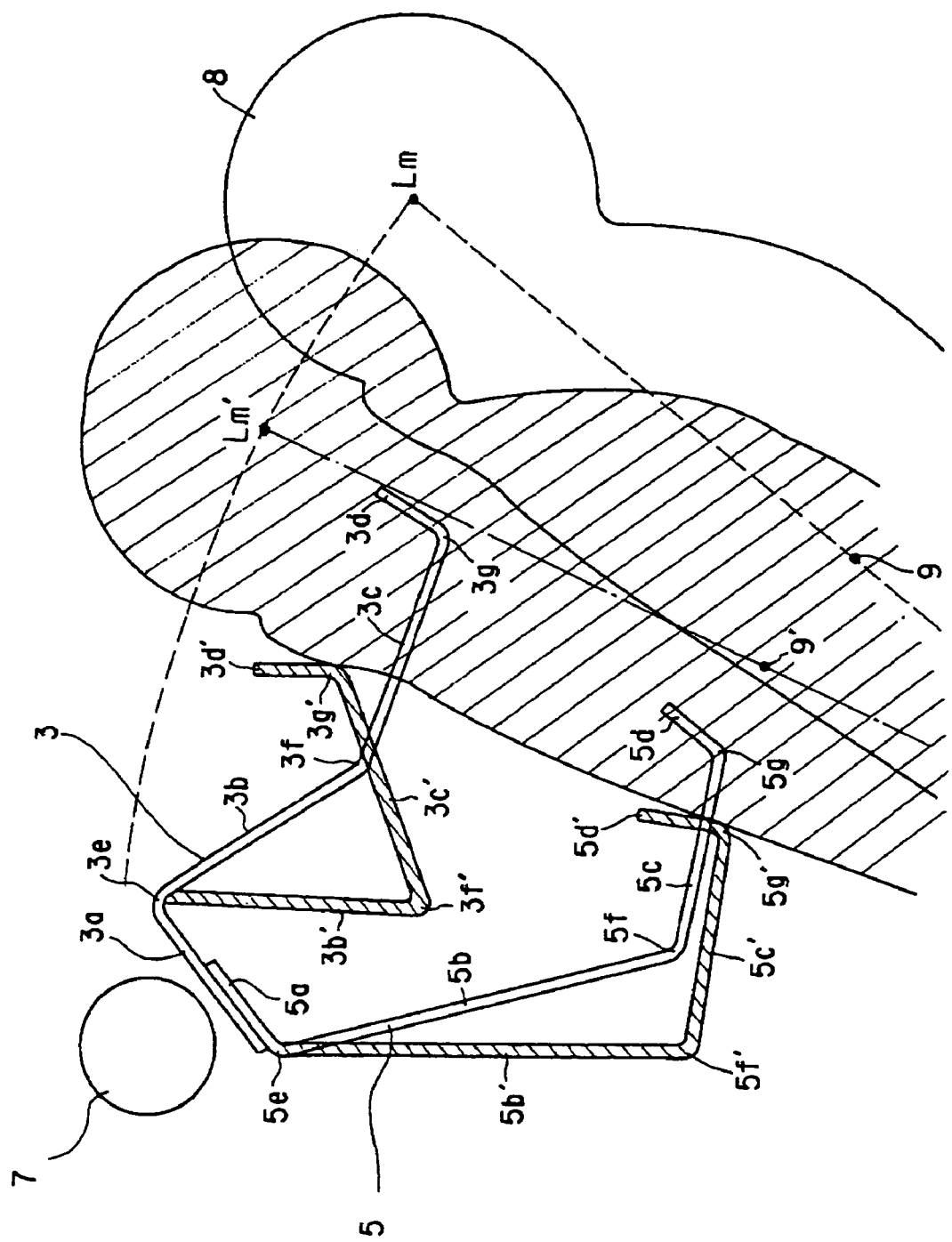

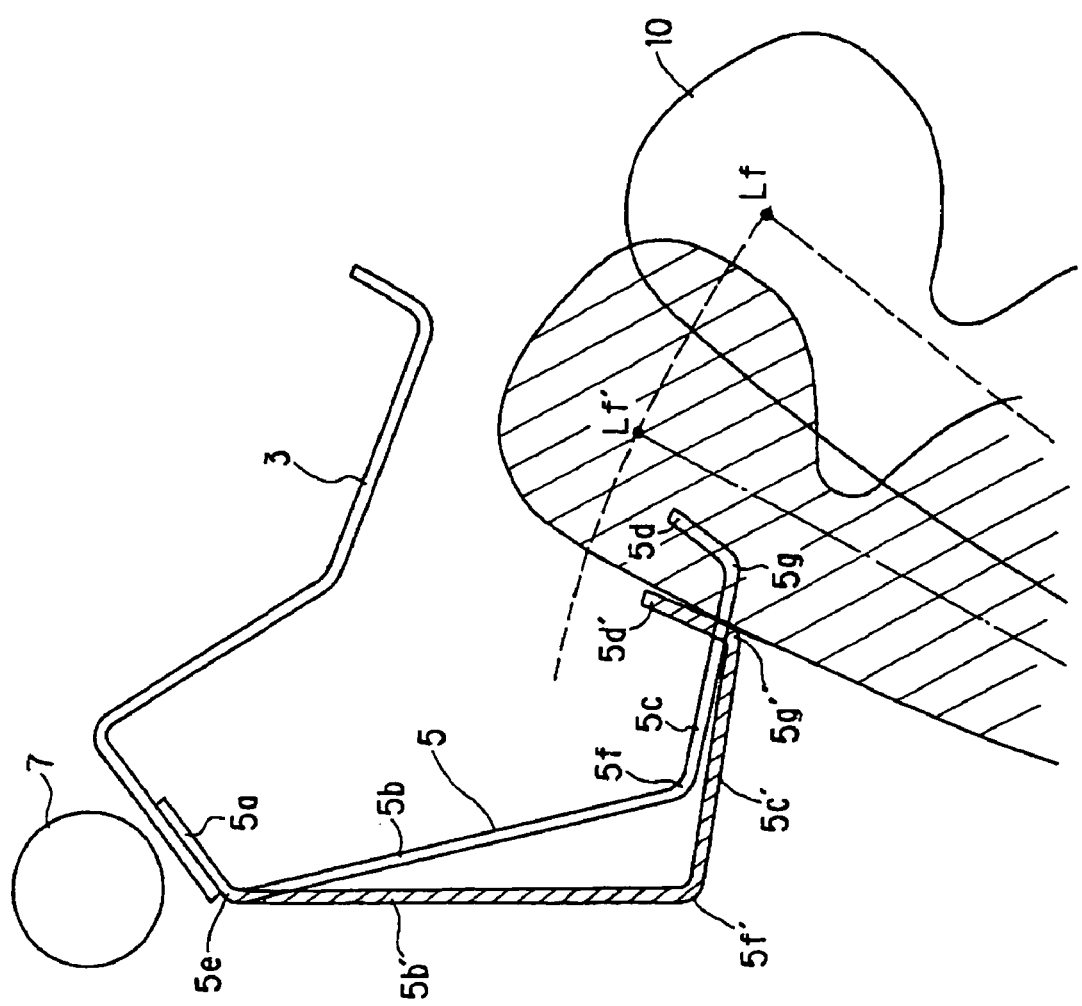

KNEE BOLSTER

CROSS-REFERENCE TO REFERENCE TO RELATED APPLICATION

This application incorporates by reference the subject matter of Application No. 2003-148704, filed in Japan on May 27, 2003, on which a priority claim is based under 35 U.S.C. § 119(a).

BACKGROUND OF THE INVENTION (1) Field of the Invention

The present invention relates to a knee bolster for a vehicle, which absorbs load received from the knees of a seated occupant who moves forward in the direction of vehicle length in the event of a vehicle collision.

(2) Description of Related Art

In recent years, the safety performance of vehicles has been significantly improved. At the same time, safety standards have been reviewed, and regulations have been gradually tightened. Conventionally, in conformity with standards, a dummy which can cover a man of relatively large size (hereinafter referred to as "the seated occupant M") has been used for vehicle head-on collision experiments. Recently, due to e.g., revisions to regulations, the safety performance has been evaluated for a woman of relatively small size (hereinafter referred to as "the seated occupant F") as well as for the seated occupant M. Accordingly, it is necessary to change the configuration of a safety device in head-on collision.

Conventionally, a knee bolster has been known as an example of a safety device which is deformed in response to load received from the knees of a seated occupant who moves forward in the direction of vehicle length in the event of vehicle head-on collision to reduce impact load applied to the knees. The conventional knee bolster, however, is not configured suitably for a woman of relatively small size.

In the case of the conventional knee bolster, if the seated occupant F drives a vehicle, her knees may pass through a space below the knee bolster. Also, if the knee bolster is moved downward to receive load applied to the seated occupant F, impact cannot be satisfactorily absorbed since a load receiving part of the knee bolster has moved downward relative to the knees of a seated occupant of large size such as the seated occupant M.

The knee bolster is installed at a predetermined location in a vehicle, and the load receiving part thereof is constantly fixed. Seated occupants differ in physical size, seated position, posture in seating, and so forth. If the knee bolster configured for the seated occupant M is only installed as a fixing device, it is impossible to reliably receive impact received from the knees of both the seated occupant M and the seated occupant F.

Further, if only one knee bolster is used to absorb impact received from the knees of both seated occupants M and F, the knee bolster needs to be larger in size, making it impossible to ensure enough space under the feet of the seated occupants M and F. At the same time, the knee bolster will increase in cost and weight.

SUMMARY OF THE INVENTION

The present invention provides a knee bolster capable of absorbing load received from the knees of seated occupants of various physical sizes.

One aspect of the present invention is to provide a knee bolster for a vehicle, which absorbs load from knees of an occupant who moves in a direction of vehicle length in the event of vehicle collision, comprising: a first knee bolster having a first load receiving part which receives the load, and a first deforming part deformed to absorb the load received by the first load receiving part; and a second knee bolster located below and juxtaposed to said first knee bolster, and having a second load receiving part which receives the load, and a second deforming part deforms to absorb the load received by the second load receiving part.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 6 is a view showing movements of a left leg knee bolster for the seated occupant M; and FIG. 7 is a view showing the movement of the left leg knee bolster for the seated occupant F.

DETAILED DESCRIPTION OF THE INVENTION

The present invention will now be described in detail with reference to the drawings showing an embodiment thereof.

When driving a vehicle, an occupant adjusts his/her seated position by adjusting the position of a seat installed in the vehicle. Examples of seat adjustments include a sliding adjustment in which a seat is slid forward and backward in the direction of vehicle length, a height adjustment in which the height is adjusted by moving a seat in the direction of vehicle height, a reclining adjustment in which a seat is reclined by adjusting the angle of a seat back, and a vertical adjustment in which a headrest installed in an upper part of a seat back to set the position of an occupant's head is moved in the direction of vehicle length or in the direction of vehicle height. Due to variations in physical size of occupants, there are an indefinitely large number of seated positions, but in the present embodiment, it is assumed that the seated occupant M and the seated occupant F have respective predetermined physical sizes in conformity with standards, and the optimum seated positions (postures) for those physical sizes are determined.

Figure 1:
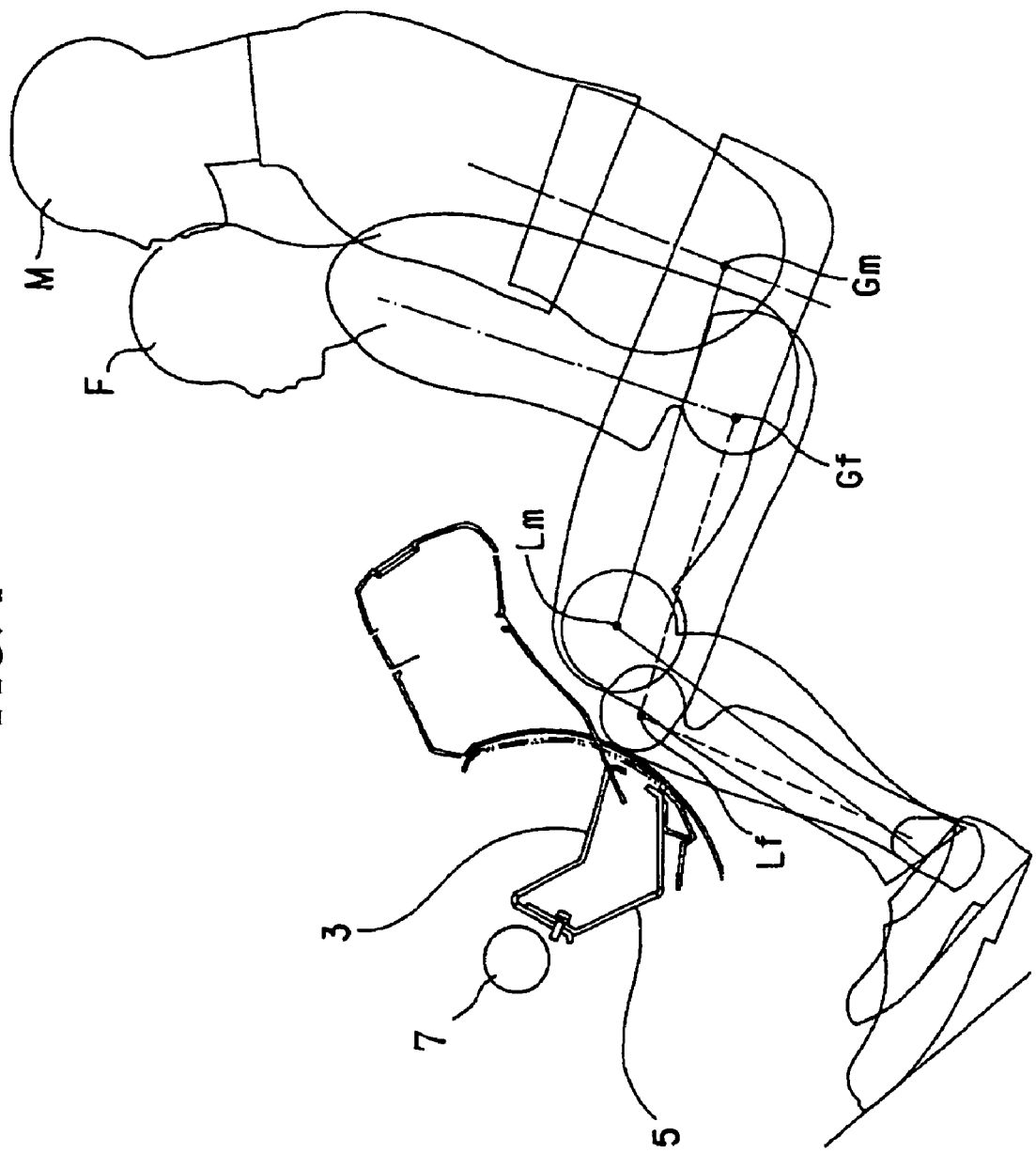
FIG. 1 is a view showing the left sides of the seated occupant M and the seated occupant F.
Figure 2:
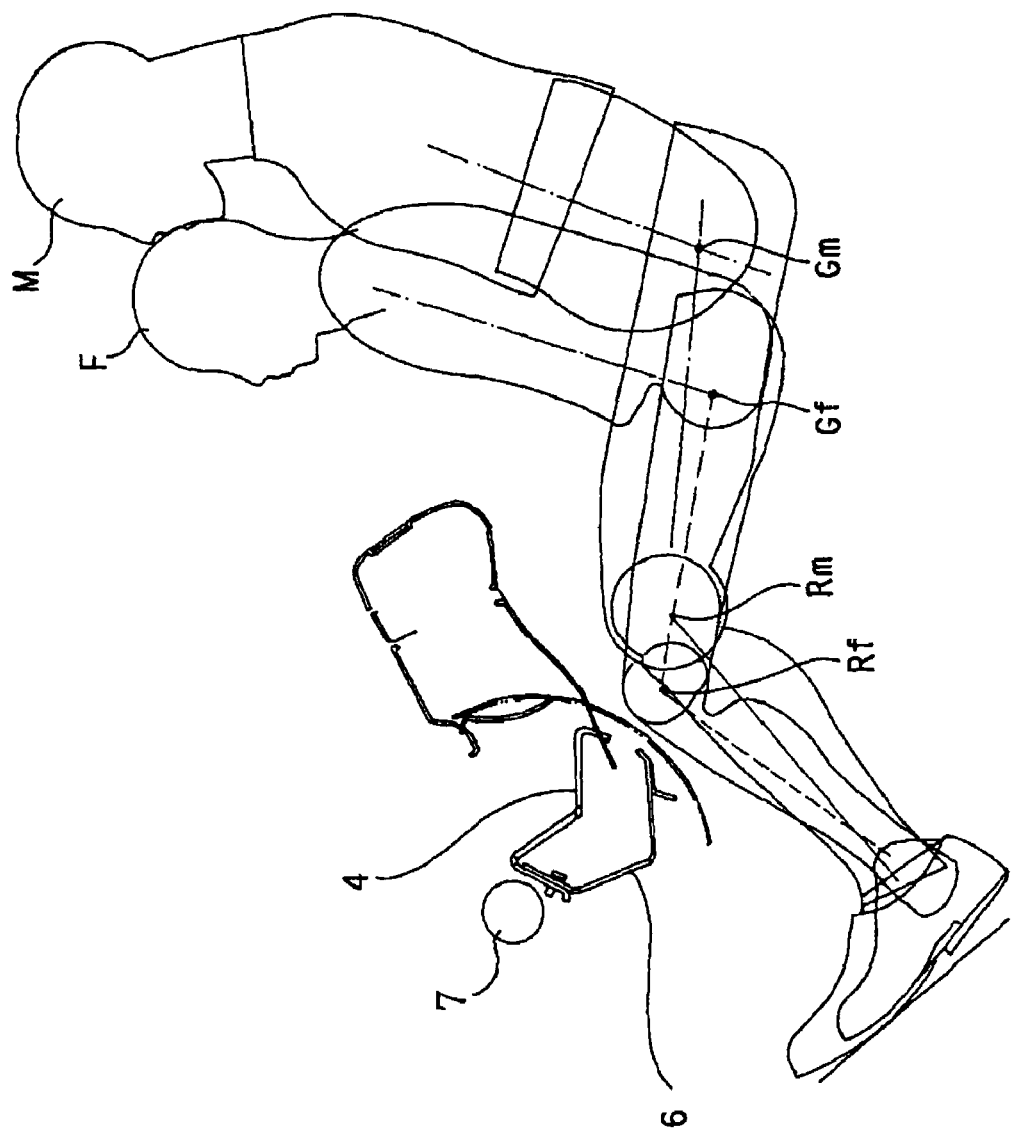
FIG. 2 is a view showing the right sides of the seated occupant M and the seated occupant F.
Figure 3:
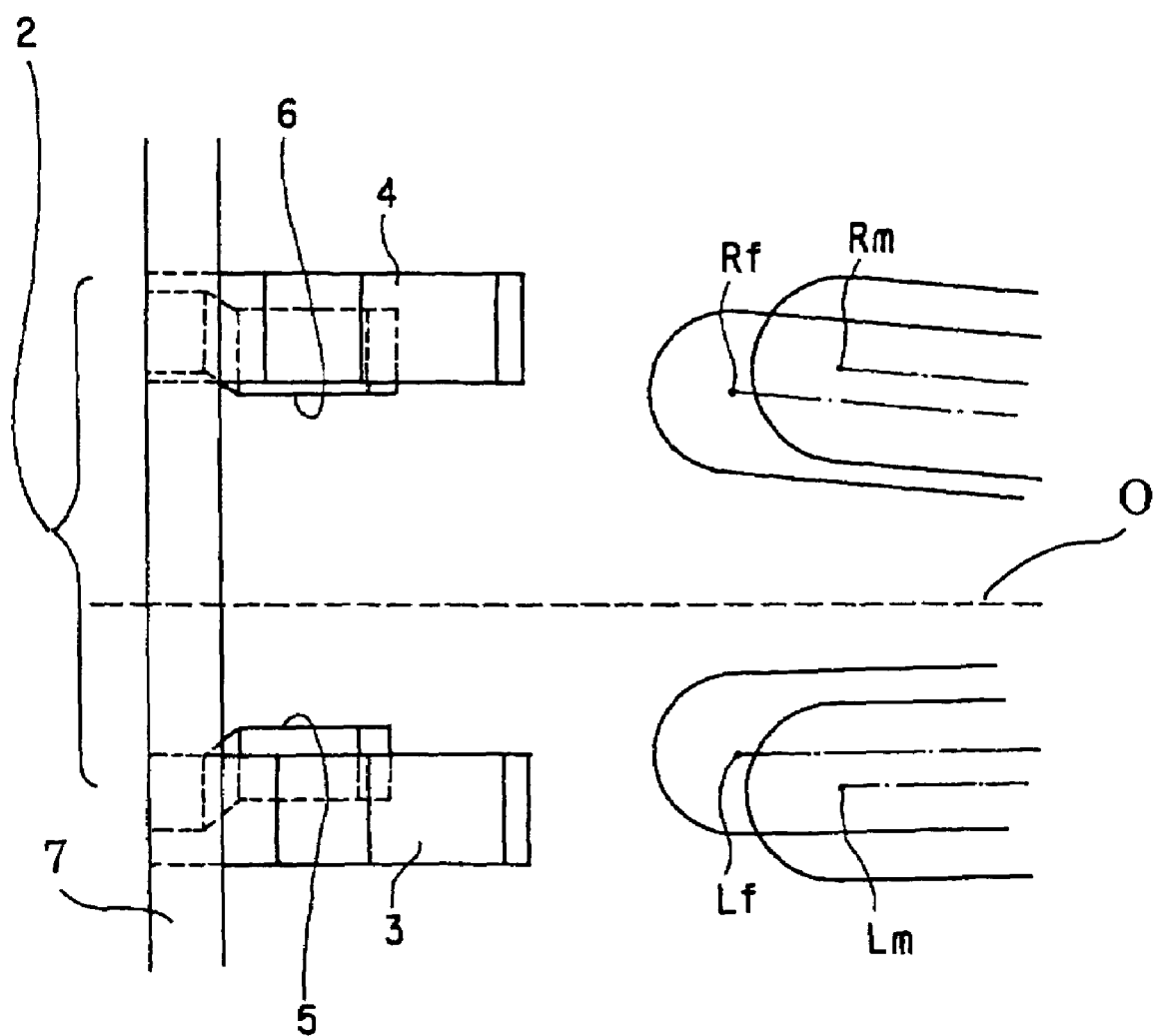
FIG. 3 is a view showing the positions of the knees of the seated occupant M and the seated occupant F.

FIGS. 1 to 3 show differences in seated positions between the seated occupant M and the seated occupant F. FIG. 1 is a side view showing the left sides of the seated occupants M and F, FIG. 2 is a side view showing the right sides of the seated occupants M and F, and FIG. 3 is plan view showing the knees of the seated occupants M and F. In FIGS. 1 to 3, Gm denotes the center of gravity of the seated occupant M, Lm denotes the position of the left knee of the seated occupant M, and Rm denotes the position of the right knee of the seated occupant M. Also, Gf denotes the center of gravity of the seated occupant F, Lf denotes the position of the left knee of the seated occupant F, and Rf denotes the position of the right knee of the seated occupant F.

The seated position of the seated occupant M is behind the seated position of the seated occupant F as viewed in the direction of vehicle length. This is because the seated occupant M is larger in physical size than the seated occupant F. As shown in FIGS. 1 to 3, the position of the center of gravity Gm and the positions of the right and left knees Lm and Rm of the seated occupant M are behind those of the seated occupant F.

Here, only the positions of the knees of the seated occupants M and F are considered. As viewed in the direction of vehicle length, the right and left knees Lm and Rm of the seated occupant M are positioned behind the right and left knees Lf and Rf of the seated occupant F. This is because the physical size of the seated occupant M is larger than that of the seated occupant F, and the seated occupant M moves his seat and adjusts the position of his seat so that his seat may be positioned behind the seat of the seated occupant F. As viewed in the direction of vehicle height, the right and left knees Lm and Rm of the seated occupant M are positioned higher than the right and left knees Lf and Rf of the seated occupant F. This is also because the seated occupant M is larger in physical size than the seated occupant F. The right knees of the seated occupant M and the seated occupant F are positioned lower than the left knees, since the right leg is stretched forward to a larger extent than the left leg so as to operate an accelerator pedal. As viewed in the direction of vehicle width, the right and left knees Lm and Rm of the seated occupant M are positioned farther away from the center line O of the seated occupant M and F as compared with the right and left knees Lf and Rf of the seated occupant F. This is also because the seated occupant M is larger in physical size than the seated occupant F. Also, the right knees of both the seated occupant M and the seated occupant F are positioned farther away from the center line O as compared with the left knees. The reason why the right leg is positioned farther away from the center line O as compared with the left leg is that the right leg is stretched outward in the direction of vehicle width as is the case with the direction of vehicle height.

Figure 4:
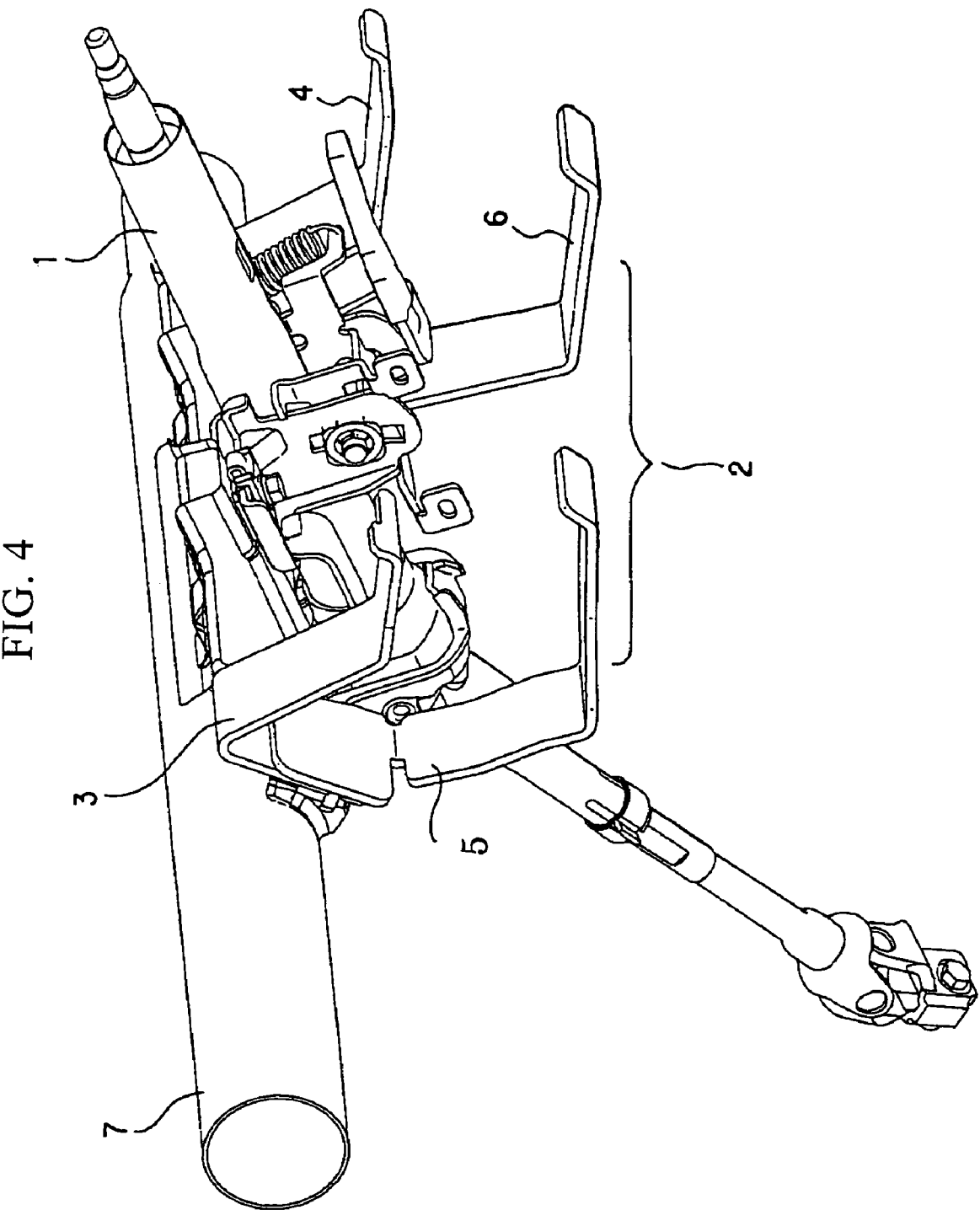
FIG. 4 is a view showing the mounting location of a knee bolster device for a driver seat.
Figure 5A:
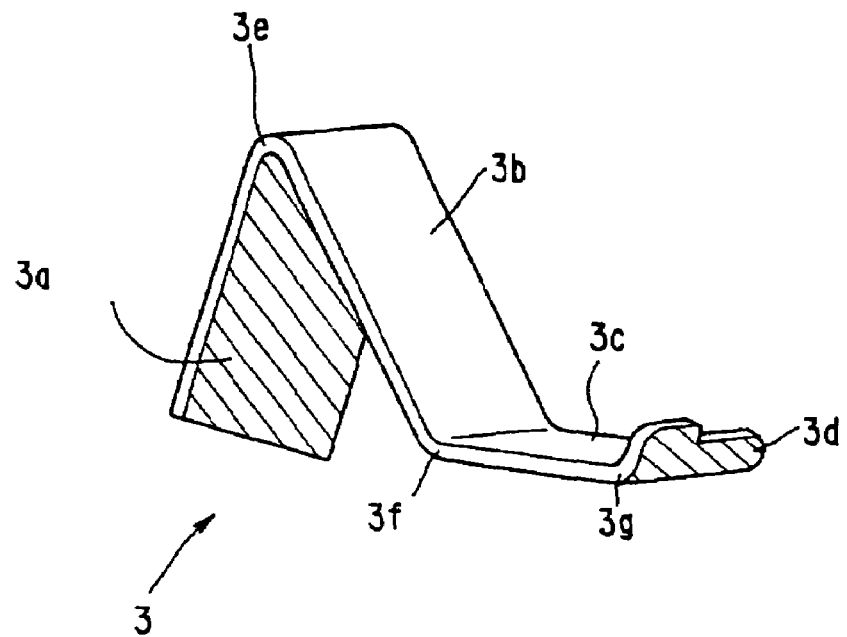
FIGS. 5A and 5B are views schematically showing a left leg knee bolster.
Figure 5B:
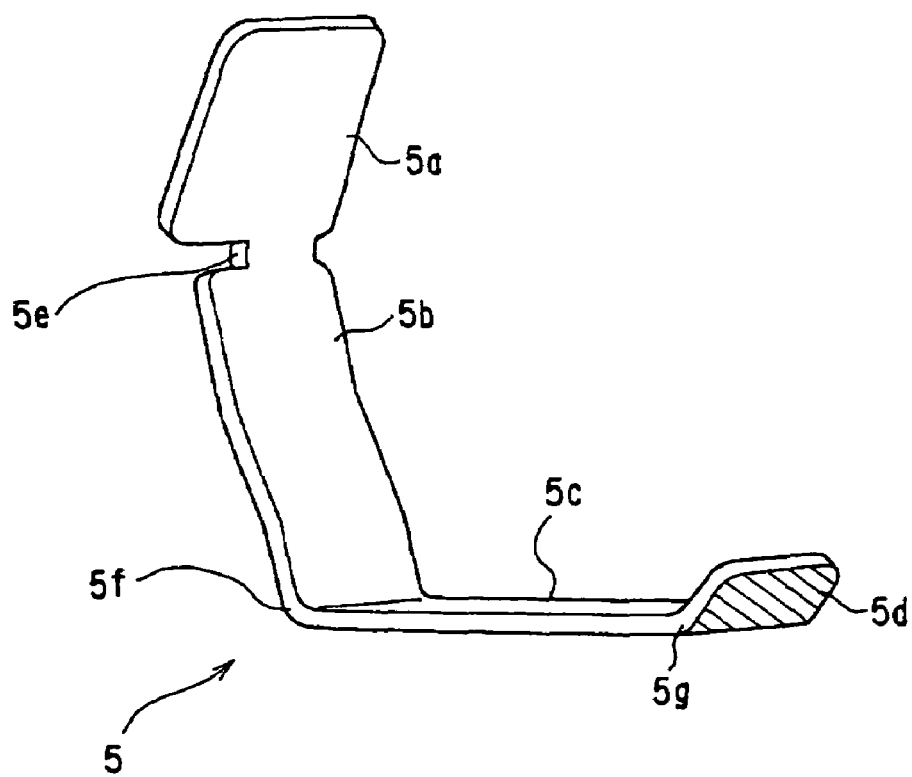

FIG. 4 is a view showing the mounting location of a knee bolster device. FIGS. 5A and 5B are views schematically showing upper and lower left leg knee absorbers. A driver seat knee bolster device 2 is installed in a dash panel, not shown, on both sides of a steering column 1 installed on the driver's seat side. The driver seat knee bolster device 2 is comprised of an upper left leg knee bolster (a first left leg knee bolster) 3 and an upper right leg knee bolster (a first right leg knee bolster) 4 for the seated occupant M, which are located in the upper part, and a lower left leg knee bolster (a second left leg knee bolster) 5 and a lower right leg knee bolster (a second right leg knee bolster) 6 for the seated occupant F, which are located in the lower part.

The upper left leg knee bolster 3 and the lower left leg knee bolster are provided with mounting parts 3a and 5a, respectively. The mounting parts 3a and 5a are joined to each other by e.g., welding, so that they are configured as an integral body. The integrated upper and left leg knee bolsters 3 and 5 are fixed to a steering supporting member 7 which supports the steering column 1 via brackets, not shown. Similarly, the upper right leg knee bolster 4 and the left leg knee bolster 6 are fixed to the steering supporting member 7.

The upper and lower left leg knee bolsters 3 and 5 will now be described.

The upper left leg knee bolster 3 is fixed to a vehicle body via the mounting part 3a. The mounting part 3a extends upward to reach a first folded part 3e as it goes rearward in the direction of vehicle length. A first extended part 3b extends from the first folded part 3e rearward in the direction of vehicle length and downward in the direction of vehicle height. A second folded part 3f is formed at the other end of the first extended part 3b, and a second extended part 3c is formed such that it extends from the second folded part 3f rearward in the direction of vehicle length. The other end of the second extended part 3c is a third folded part 3g. The third folded part 3g is formed with a load receiving part 3d (a first load receiving part) which receives impact from the knees of a seated occupant who moves forward in the direction of vehicle length in the event of vehicle head-on collision.

The lower left leg knee bolster 5 is fixed to the vehicle body via the mounting part 5a. The mounting part 5a extends upward in the direction of vehicle height as it goes rearward in the vehicle. A first folded part 5e is formed at a lower end of the mounting part 5a. A first extended part 5b extends from the first folded part 5e rearward in the direction of vehicle length and downward in the direction of vehicle height. A second folded part 5f is formed at the other end of the first extended part 5b, and a second extended part 5c extends from the second folded part 5f rearward in the direction of vehicle length. The other end of the second extended part 5c is a third folded part 5g. The third folded part 3g is formed with a load receiving part 5d (a second load receiving part).

The load receiving part 3d of the upper left leg knee bolster 3 and the load receiving part 5d of the lower left leg knee bolster 5a are spaced in vertical direction.

FIGS. 6 and 7 show how the knees of a seated occupant abut the above described left leg knee bolsters 3 and 5, and how impact is absorbed. FIG. 6 is a view showing movements of the left leg knee bolsters 3 and 5 in the case where load is received from the knees of the seated occupant M. FIG. 7 is a view showing movements of the left leg knee bolsters 3 and 5 in the case where load is received from the knees of the seated occupant F. In FIGS. 6 and 7, solid lines indicate the left legs of the seated occupants M and F before they are moved and the left leg knee bolsters 3 and 5 before they are deformed, and diagonal lines indicate the left legs of the seated occupants M and F after they are moved and the left leg knee bolsters 3 and 5 after they are deformed.

The load receiving part 3d of the upper left leg knee bolster 3 is installed at a location opposing a left knee 8 of the seated occupant M. When vehicle collides head-on while the seated occupant M is seated, he moves forward in the direction of vehicle length, and therefore, the left knee 8 moves forward from the position Lm in the direction of vehicle length to abut the load receiving part 3d of the upper left leg knee bolster 3 via the dash panel, not shown. Then, as the left knee 8 moves further forward in the direction of vehicle length, the upper left leg knee bolster 3 is deformed to absorb load received from the left knee 8. Further, when the left knee 8 moves forward in the direction of vehicle length and a shin 9 moves forward in the direction of vehicle length, the shin 9 of the seated occupant M abuts the load receiving part 5d of the lower left leg knee bolster 5. Thereafter, when the knee 8 and the shin 9 move forward in the direction of vehicle length to reach a position Lm' and a shin 9', respectively, both the upper left leg knee bolster 3 and the lower left leg knee bolster 5 are deformed to absorb load received from the seated occupant M.

The mounting part 3a of the deformed upper left leg knee bolster 3 is not deformed. The first extended part 3b moves downward about the first folded part 3e as a fulcrum in the direction of vehicle height to reach a position 3b'. With this movement, the second folded part 3f moves forward in the direction of vehicle length to reach a position 3f'. The second extended part 3c is moved upward in the direction of vehicle height to reach a position 3c' while being depressed forward in the direction of vehicle length. The third folded part 3g is also moved forward in the direction of vehicle length and upward in the direction of vehicle height to a position 3g'. The load receiving part 3d abuts the knee 8, and moves forward in the direction of vehicle length and upward in the direction of vehicle height to reach a position 3d'. When the load receiving part 3d of the upper left leg knee bolster 3 receives load from the seated occupant M, first folded part 3e, first extended part 3b, second folded part 3f, second extended part 3c, and third folded part 3g of the upper left leg knee bolster 3 are deformed and moved as a first deforming part. As a result, the load received from the knee 8 of the seated occupant M is absorbed by the upper left leg knee bolster 3 to reduce impact applied to the seated occupant M.

On the other hand, the mounting part 5a of the deformed lower left leg knee bolster 5 is not deformed. The first extended part 5b moves downward about the first folded part 5e as a fulcrum in the direction of vehicle height to reach a position 5b'. With this movement, the second folded part 5f is pushed forward in the direction of vehicle length to reach a position 5f'. The second extended part 5c and the third folded part 5g are moved downward in the direction of vehicle height to reach a position 5c' and a position 5g', respectively. The load receiving part 5d also abuts the shin 9, and moves forward in the direction of vehicle length to reach a position 5d'. In this way, when the load receiving part 5d of the lower left leg knee bolster 5 receives load from the seated occupant M, first folded part 5e, first extended part 5b, second folded part 5f, second extended part 5c, and third folded part 5g of the upper left leg knee bolster 5 are deformed and moved as a second deforming part. As a result, the load received from the shin 9 of the seated occupant M is absorbed by the upper left leg knee bolster 5 to reduce impact applied to the seated occupant M.

The load receiving part 5d of the lower left leg knee bolster 5 is installed at a location opposing a knee 10 of the seated occupant F. When the vehicle collides head-on while the seated occupant F is seated, she moves forward in the direction of vehicle length, and therefore, the knee 10 moves forward in the direction of vehicle length to abut the load receiving part 5d of the lower left leg knee bolster 5 via the dash panel, not shown. Namely, the knee 10 moves from the position Lf toward a position Lf'. On this occasion, the position Lf of the knee 10 is lower than the position Lm of the knee 8 of the seated occupant M. Therefore, the knee 10 does not abut the load receiving part 3d of the upper left leg knee bolster 3. When the left knee 10 moves forward in the direction of the vehicle, the lower left leg knee bolster 5 is deformed to absorb load.

The mounting part 5a of the deformed lower left leg knee bolster 5 is not deformed. The first extended part 5b moves downward about the first folded part 5e as a fulcrum in the direction of vehicle height to reach a position 5b'. With this movement, the second folded part 5f is pushed forward in the direction of vehicle length to reach a position 5f'. The second extended part 5c and the third folded part 5g are moved to a position 5c' and a position 5g', respectively. The load receiving part 5d also abuts onto the knee 10, and moves forward in the direction of vehicle length and upward in the direction of vehicle height to reach a position 5d'. In this way, when the component parts of the lower left leg knee bolster 5 are deformed and moved, the lower left leg knee bolster 5 absorbs load received from the knee 10 of the seated occupant F to reduce impact applied to the seated occupant F.

As stated above, when the seated occupant M is seated, the upper and lower knee bolsters 3 and 5 are deformed to absorb impact energy, and when the seated occupant F is seated, the lower knee bolster 5 is deformed to absorb impact energy. It is preferred that the upper knee bolsters 3 and 4 intended for the seated occupant M have a higher stiffness than the lower knee bolsters 5 and 6 intended for the seated occupant F because the seated occupant M is larger in physical size than the seated occupant F, and hence greater impact energy is applied to the seated occupant M.

It is also preferred that the lower knee bolsters 5 and 6 are arranged closer to the center of the seat in the direction of vehicle width as compared with the upper knee bolsters 3 and 4 as shown in FIG. 3. This is because the seated occupant F is smaller in physical size than the seated occupant M, and hence the knees of the seated occupant F are positioned closer to the center of the seat in the direction of vehicle width as compared with the knees of the seated occupant M. This arrangement makes it possible to absorb load received from the seated occupant F in a more reliable manner. It should be noted that the amount of displacement of the lower right leg knee bolster 6 relative to the upper right leg knee bolster 4 in the direction of vehicle width is set to be smaller than the amount of displacement of the lower left leg knee bolster 5 relative to the upper left leg knee bolster 3 in the direction of vehicle width. This is because the right leg is used to operate the accelerator pedal, and the right knee of the seated occupant F is displaced to a smaller degree as compared with the right knee of the seated occupant M.

In the present embodiment, each knee bolster is comprised of the four component parts including the mounting part, the first extended part, the second extended part, and the load receiving part; and the three deforming parts including the first folded part, the second folded part, and the third folded part. The present invention, however, is not limited to this, but each knee bolster may be comprised of five component parts and four deforming parts, or six component parts and five deforming parts, insofar as it is configured such that a load receiving part absorbs impact load received from the knees of a seated occupant, and deformed as a result.

Although the left leg knee bolsters 3 and 5 configured for a driver seat have been described in detail, detailed description of the right leg knee bolsters 4 and 6 is omitted because they are configured to be symmetrical in shape to the left leg knee bolsters 3 and 5 with respect to the steering column 1. It should be noted that as described previously, since the right knee is positioned lower than the left knee, load can be absorbed in a more reliable manner if the right leg knee bolsters 4 and 6 are located at a level lower than the left leg knee bolsters 3 and 5, respectively. Also, it should be noted that as described previously, since the right knee is positioned farther away from the center line O of the seat as compared with the left knee, load can be absorbed in a more reliable manner if the right leg knee bolsters 4 and 6 are arranged farther away from the center line O of the seat, i.e. if the amount of displacement of the right leg knee bolsters 4 and 6 relative to the center line O of the seat is set to be greater than the amount of displacement of the left leg knee bolsters 3 and 5 relative to the center line O of the seat. It goes without saying that the driver seat knee bolster device 2 may be provided for a passenger seat, too.

Therefore, the use of the drive seat knee bolster device 2 according to the above described embodiment of the present invention makes it possible to absorb impact by deformation of each knee bolster even if seated occupants differ in physical size and positions of their knees. Further, since the knee bolsters are disposed in the upper and lower parts, they can efficiently absorb impact energy independently of each other.

As described above in detail, the knee bolster apparatus according to the present invention is disposed in front of a seat in a vehicle, and is comprised of the upper and lower knee bolsters, which are each comprised of the load receiving part that receives load from the knees of a seated occupant who moves forward in the direction of vehicle length in the event of vehicle head-on collision, and the deforming part that moves the load receiving part deformed by the load forward in the direction of vehicle length, and therefore, it is possible to absorb load not only from the knees of the seated occupant M but also from the knees of the seated occupant F. Since the upper and lower knee bolsters are separately deformed, they absorb impact energy independently of each other.

Further, since the lower knee bolsters are arranged closer to the center of the seat as compared with the upper knee bolsters, and the right leg knee bolsters are arranged farther away from the center of the seat as compared with the left leg knee bolsters, it is possible to cope with variations in the positions of the knees of the seated occupant M and the seated occupant F.

Further, in the knee bolster apparatus according to the present invention, since the upper knee bolsters have a higher stiffness than the lower knee bolsters, it is possible to absorb load from the knees of the seated occupant M to which greater impact is applied.

Although in the above described embodiment, all the upper, lower, right, and left knee bolsters are configured, such that they are disposed according to the physical size of a seated occupant and the positional relationship between the right knee and the left knee, the present invention is not limited to this, but at least the load receiving part of each knee bolster may be configured such that they are disposed according to the physical size of a seated occupant and the positional relationship between the right knee and the left knee. Further, although in the above described embodiment, both the upper knee bolsters 3 and 4 and the lower knee bolsters 5 and 6 as the right leg knee bolsters and the left leg knee bolsters are disposed according to the physical size of a seated occupant and the positional relationship between the right knee and the left knee, the present invention is not limited to this, but either the upper knee bolsters 3 and 4 or the lower knee bolsters 5 and 6 as the right leg knee bolsters and the left leg knee bolsters may be disposed according to the physical size of a seated occupant and the positional relationship between the right knee and the left knee.

What is claimed is:

1. A knee bolster for a vehicle, which absorbs load from knees of an occupant who moves in a direction of vehicle length in an event of vehicle collision, comprising:
    a first knee bolster having a first load receiving part that receives the load, and a first deforming part deformed to absorb the load received by said first load receiving part; and
    a second knee bolster located below and juxtaposed to said first knee bolster, and having a second load receiving part that receives the load, and a second deforming part deformed to absorb the load received by said second load receiving part,
    wherein, said second knee bolster is disposed closer to a center of a seat than said first knee bolster.

2. A knee bolster for a vehicle, which absorbs load from knees of an occupant who moves in a direction of vehicle length in an event of vehicle collision, comprising:
    a first knee bolster having a first load receiving part that receives the load, and a first deforming part deformed to absorb the load received by said first load receiving part; and
    a second knee bolster located below and juxtaposed to said first knee bolster, and having a second load receiving part that receives the load, and a second deforming part deformed to absorb the load received by said second load receiving part,
    wherein, at least one of said first knee bolster and said second knee bolster includes a right leg knee bolster and a left leg knee bolster, and
    said right leg knee bolster is adapted to be displaced in a direction of vehicle height relative to a center line of a seat to a smaller extent as compared with said left leg knee bolster.

3. A knee bolster for a vehicle, which absorbs load from knees of an occupant who moves in a direction of vehicle length in an event of vehicle collision, comprising:
    a first knee bolster having a first load receiving part that receives the load, and a first deforming part deformed to absorb the load received by said first load receiving part; and
    a second knee bolster located below and juxtaposed to said first knee bolster, and having a second load receiving part that receives the load, and a second deforming part deformed to absorb the load received by said second load receiving part,
    wherein, at least one of said first knee bolster and said second knee bolster includes a right leg knee bolster and a left leg knee bolster, and
    said right leg knee bolster is located at a level lower than said left leg knee bolster.

4. A knee bolster for a vehicle, which absorbs load from knees of an occupant who moves in a direction of vehicle length in an event of vehicle collision, comprising:
    a first knee bolster having a first load receiving part that receives the load, and a first deforming part deformed to absorb the load received by said first load receiving part; and
    a second knee bolster located below and juxtaposed to said first knee bolster, and having a second load receiving part that receives the load, and a second deforming part deformed to absorb the load received by said second load receiving part,
    wherein, said first knee bolster includes a first right leg knee bolster and a first left leg knee bolster,
    said second knee bolster includes a second right leg knee bolster and a second left leg knee bolster,
    said second knee bolster is disposed closer to a center of a seat than said first knee bolster, and said second right leg knee bolster is adapted to be displaced in a direction of a width of the vehicle with respect to said first right leg knee bolster to a smaller extent than in a case where said second left leg knee bolster is displaced relative to said first left leg knee bolster in a direction of vehicle width.

5. A method of protecting an occupant from a vehicle collision, comprising:
  providing a first load receiving part at a height opposing a knee of a person of a first build; and
  providing a second load receiving part, provided separately from the first load receiving part, at a height opposing a knee of a person of a second build smaller than the person of the first build and opposing a shin of the person of the first build,
  wherein the second load receiving part providing step includes the step of,
  providing the second load receiving part closer to an imaginary center line, extending in a longitudinal direction of the vehicle, of an occupant's seat.

* * * * *